United States Patent [19]
Chen et al.

[11] Patent Number: 5,828,590
[45] Date of Patent: Oct. 27, 1998

[54] MULTIPLIER BASED ON A VARIABLE RADIX MULTIPLIER CODING

[75] Inventors: Hong-Yi Chen; Wei-Xin Gai, both of Beijing, China

[73] Assignee: United Microelectronics Corp., Taiwan

[21] Appl. No.: 758,633

[22] Filed: Nov. 27, 1996

[51] Int. Cl.⁶ .................................. G06F 7/38; G06F 7/52
[52] U.S. Cl. ........................................ 364/760.01; 364/746
[58] Field of Search ..................................... 364/746, 757, 364/746.2, 754.01, 759, 760.01, 760.04, 760.05

[56] References Cited

U.S. PATENT DOCUMENTS

| | | | |
|---|---|---|---|
| 4,528,641 | 7/1985 | Burrows | 364/757 |
| 4,965,762 | 10/1990 | Williams | 364/760.04 |
| 5,107,451 | 4/1992 | Houk | 364/746 |
| 5,150,322 | 9/1992 | Smith et al. | 364/760.01 |
| 5,297,206 | 3/1994 | Orton | 380/30 |

OTHER PUBLICATIONS

"A Method for Obtaining Digital Signatures and Public Key Cryptosystems," by Rivest et al., MIT Laboratory for Computer Science and Department of Mathematics (Feb. 1978). pp. 120–126.

*Primary Examiner*—Chuong Dinh Ngo
*Attorney, Agent, or Firm*—Rabin & Champagne, P.C.

[57] ABSTRACT

A modular multiplication method and device is based on RSD arithmetic, partial product reduction techniques and precomputation techniques. During multiplication, redundant representation is adopted to carry out addition of two large numbers (512 bits or longer) without carry propagation. A multiplication based on variable radix multiplier coding is performed by coding $y_i$ into a radix_8 digit $\hat{y}_j$, except when $\hat{y}_j = \pm 3$, in which case $y_i$ is coded into a radix_4 digit $\hat{y}_j$. This modular multiplication method is used for VLSI implementation of many public-key cryptosystems, such as RSA.

10 Claims, 6 Drawing Sheets

○ :radix_2　　◇ :radix_4　　□ :radix_8　　△ :varied radix

○ :k=2　　◇ :k=3　　□ :k=4　　△ :k=5
● :k=6　　◆ :k=7　　■ :k=8　　▲ :k=9

MULTIPLIER BASED ON A VARIABLE RADIX MULTIPLIER CODING

BACKGROUND OF THE INVENTION

1. Field of the Invention

The invention relates to a digital multiplier based on variable radix multiplier coding, and more particularly, to a multiplier based on variable radix multiplier coding for a modular multiplication device.

2. Description of the Related Art

Modular multiplication of two large numbers, e.g., 512 bits or longer, is the kernel operation in many public-key cryptography systems such as RSA (Rivest, Shamir, Adleman; see "A Method For Obtaining Digital Signatures And Public Key Cryptosystems", Comm. of the ACM, Vol. 21, No. 2, pp. 120–126, February 1978). Because modular multiplication is a low efficiency operation, it becomes a bottleneck in limiting the computation speed of public-key cryptographic systems.

There are several ways to increase multiplication speed. One is to reduce the number of partial products (PP) computed as part of the multiplication process. By use of a modified Booth algorithm, the total PP can be reduced by one-half. Another method is speeding up the addition of the partial product array. Carry Save Addition (CSA) and Redundant Signed Digit (RSD) are two important arithmetic schemes which can be used to carry out addition or subtraction operations in O(1) time without resorting to the use of carry propagation techniques.

Modular reduction algorithms generally can be divided into two types. One type utilizes a division operation, such as a fast division algorithm, using RSD arithmetic. The other type does not perform division, but rather uses, e.g., fast quotient estimation or other precomputation techniques.

The principle behind conventional multiplication using radix_4 or radix_8 multiplier coding is as follows. Consider a multiplication $P = X \times Y$ where X is the multiplicand, Y is the multiplier, P is the product, and X and Y are both n-bit binary redundant numbers. If Y is expressed as $$Y = \sum_{i=0}^{n-1} y_i 2^i,$$

with $y_i \in \{-1,0,1\}$, then the number of $PP_i$ that must be calculated is n. Y can be coded into a radix_4 number $$\hat{Y}, \hat{Y} = \sum_{j=0}^{[n/2]} \hat{y}_j 4^j$$

with $\hat{y}_j \in \{0, \pm 1, \pm 2\}$ having a length approximately equal to half the length of Y. The produced $PP_j$ are $0, \pm X, \pm 2X$, respectively, in which $\pm 2X$ can easily be implemented by shifting X. Thus, the number of $PP_j$ to be calculated is reduced to n/2. Y can also be expressed as a radix_8 number, $$\hat{Y} = \sum_{j=0}^{[n/3]} \hat{y}_j 8^j$$

with $\hat{y}_j \in \{0, \pm 1, \pm 2, \pm 3, \pm 4\}$, reducing the length of Y to n/3. But when $\hat{y}_j$ is evaluated as $\pm 3$, this $PP_j$ is not provided by simply shifting, because the formed partial products $\pm(1X+2X)$ include two items. If the probability of $\hat{y}_j$ being evaluated as "nonshiftable" digits, i.e., 3 and −3, is t, then the number of necessary $PP_j$ is $(1+t)*n/3$. Statistically, t is approximately ¼. Then the number of necessary $PP_j$ is 5n/12.

For example, for a multiplication $P = X \times Y$ where X is 011011, Y is 11111, P is the product, and X and Y are both 6-bit binary redundant numbers, P can be expressed as follows:

| | |
|---|---|
| multiplicand X | 011011 |
| multiplier Y | 111111 |
| partial product $pp_1$ | 011011 |
| partial product $pp_2$ | 011011 |
| partial product $pp_3$ | 011011 |
| partial product $pp_4$ | 011011 |
| partial product $pp_5$ | 011011 |
| partial product $pp_6$ | 011011 |

For $$Y = \sum_{i=0}^{5} y_i 2^i,$$

with $y_i \in \{-1,0,1\}$, the number of $PP_i$ calculated is 6. Y can be coded into a radix_4 number $$\hat{Y}, \hat{Y} = \sum_{j=0}^{3} \hat{y}_j 4^j$$

with $\hat{y}_j \in \{0, \pm 1, \pm 2\}$ having a length approximately equal to about half the length of Y. The produced $PP_j$ are $0, \pm X, \pm 2X$, respectively, in which $\pm 2X$ can easily be implemented by shifting X. Then, the number of $PP_j$ calculated is reduced to 4. The radix_4 process can be expressed as follows:

| | |
|---|---|
| multiplicand X | 01101$\bar{1}$ |
| multiplier $\hat{Y}$ | 010000$0\bar{1}$ |
| partial product $pp_1$ | −011011 |
| partial product $pp_2$ | 000000 |
| partial product $pp_3$ | 000000 |
| partial product $pp_4$ | 011011 |

Y can also be expressed as a radix_8 number, $$\hat{Y} = \sum_{j=0}^{2} \hat{y}_j 8^j$$

with
$\hat{y}_j \in \{0, \pm 1, \pm 2, \pm 3, \pm 4\}$, decreasing the length of Y to 3. P can be expressed as follows:

| | |
|---|---|
| multiplicand X | 011011 |
| multiplier $\hat{Y}$ | 00100000$\bar{1}$ |
| partial product $pp_1$ | −011011 |
| partial product $pp_2$ | 000000 |
| partial product $pp_3$ | 011011 |

But when $\hat{y}_j$ is evaluated as −3 (011), $PP_j$ are not produced by simply shifting, because the formed partial products $\pm(1X+2X)$ have two items, as shown in Table 1. Therefore, there still exists a need to reduce the number of partial products ($PP_j$) that must be calculated in order to increase the efficiency of the multiplication operation.

TABLE 1

A radix-8 coding rule of the multiplier

| $\hat{y}_j$ | | $PP_j$ | condition |
|---|---|---|---|
| 0 | 000 | 0X | shiftible |
| 1 | 001 | X | shiftable |
| 2 | 010 | 2X | shiftable |
| 3 | 011 | X+2X | nonshiftable |
| 4 | 100 | 4X | shiftable |
| -1 | -001 | -X | shiftable |
| -2 | -010 | -2X | shiftable |
| -3 | -011 | -(X+2X) | nonshiftable |
| -4 | -100 | -4X | shiftable |

SUMMARY OF THE INVENTION

It is therefore an object of the invention to provide a multiplier based on variable radix multiplier coding which removes the "nonshiftable" digits and increases multiplication efficiency.

Variable radix multiplier coding according to the invention is basically coding $y_i$ into radix_8 digit $\hat{y}_j$ except for the case of $\hat{y}_j = \pm 3$, in which $y_i$ is coded into radix_4 digit $\hat{y}_j$.

In order to achieve the object of the invention, a method of modular multiplication operation is performed as $P = X \times Y$ mod Q, where multiplicand X and multiplier Y are n-bit binary redundant numbers, Q is n-bit binary number, P is the result of the modular multiplication, and $P_{max}$ is the most significant nonzero bit of P. The method includes the following steps. $2^n \times e \times d$ mod Q is precomputed for e=1 to $[(8d+11)/d]$, to determine precomputed results $a_e$, where d is a predetermined integer. The precomputed results $a_e$ are stored in a look-up table memory. $2^n \times g$ mod Q is precomputed for g=1 to d-1 to determine precomputed results $b_g$. The precomputed results $b_g$ are stored in the look-up table memory. Y is coded by variable radix multiplier coding into a radix_8 digit except when the radix_8 digit is ±3, in which case Y is coded into a radix_4 digit. Partial product addition is performed according to Y as encoded. A first modular reduction is performed according to the precomputed results $a_e$ stored in the look-up table memory. A second modular reduction is performed according to the precomputed results $a_e$ and $b_g$ stored in the look-up table memory to determine the intermediate result P" of the modular multiplication operation. The intermediate result P" is then adjusted, such that $X \times Y$ mod $Q = P'' - 2Q \times P_{max}$ when $|P''| \geq 2Q$, $X \times Y$ mod $Q = P'' - Q \times P_{max}$ when $2Q > |P''| \geq Q$, and $X \times Y$ mod $Q = P''$ when $|P''| < Q$.

BRIEF DESCRIPTION OF THE DRAWINGS

The invention can be more fully understood from the following detailed description of the preferred embodiment, with reference to the accompanying drawings, wherein.

DETAILED DESCRIPTION OF THE PREFERRED EMBODIMENT

A quaternary parallel addition technique using RSD arithmeric, a fast multiplication algorithm using variable radix multiplier coding, a comparison of radix_4, radix_8, and variable radix results algorithm, the precomputation technique for modular reduction, and the modular multiplication device applied to an RSA cryptographic system are described below, with reference to the drawings.

A Quaternary Parallel Addition Technique Using RSD Arithmetic

In a number representation with radix r>1, each digit is allowed to assume the exact values 0,1,2, . . . , r−1. A number X has a unique representation $$X = \sum_{i=0}^{n-1} x_i r^i$$

for $x_i \in [0, r-1]$. In a redundant representation with the same radix r, each digit is allowed to assume more than r values. Then the redundant representation of X is not unique with $x_i \in [-z, z]$ where $[r/2] \leq z \leq r-1$ and $[r/2]$ is the largest integer not larger than r/2. The main advantages of redundant representation are:

1) Addition/Subtraction can be carried out in O(1) without carry propagation, independent of the length of the operands.

2) Redundant representation can easily handle negative numbers. The sign of the number will be directly determined by the most significant nonzero digit $P_{max}$.

3) It can be used to realize a fast multiplication and division algorithm.

The representation for an n-digit quaternary number X is $$X = \sum_{i=0}^{n-1} x_i 4^i,$$

with $x_i \in \{0,1,2,3\}$. When two quaternary numbers are added, carry propagation inevitably occurs, resulting in a long delay, especially for addition of large numbers. This problem can be solved using RSD arithmetic, where a quaternary number X is expressed as $$X = \sum_{i=0}^{n-1} x_i 4^i,$$

with $x_i \in [-3,3]$ having more than one expression, e.g., the number 7 has more than one expression such as (1, 3), (2, −1) and so on.

Figures 1, 2A, 2B:
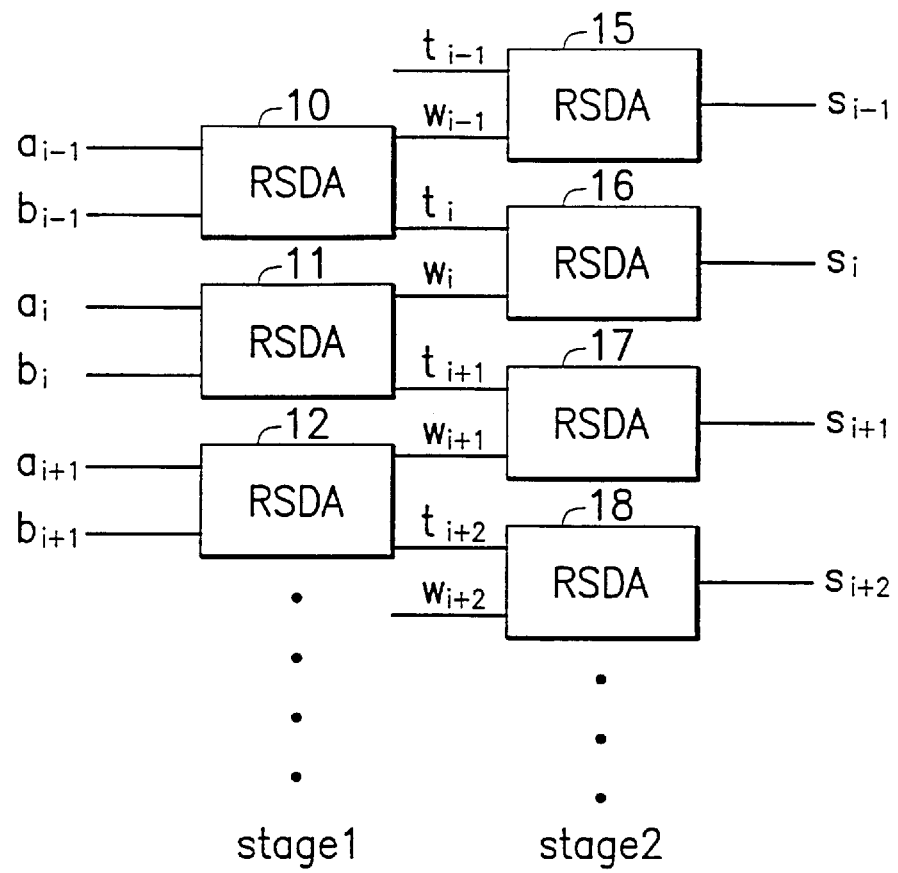
FIG. 1 is a block diagram of a quaternary parallel adder using RSD arithmetic.
FIG. 2a illustrates a procedure for adding two quaternary numbers.
FIG. 2b shows the illustration of FIG. 2a, expressed in binary numbers.

Referring to FIG. 1, there is shown a block diagram of a quaternary parallel adder using RSD arithmetic, which includes two stages of RSD adders (RSDA) independent of the length of the numbers being added. For example, Stage 1 includes RSDA 10–12 and Stage 2 includes RSDA 15–18.

The quaternary parallel addition process includes the following steps.

Input: $A = \sum_{i=0}^{n-1} a_i 4^i$, RSD number;

$B = \sum_{i=0}^{n-1} b_i 4^i$, RSD number; $a_i, b_i \in \{-3,-2,-1,0,1,2,3\}$

Output: $S = A + B = \sum_{i=0}^{n-1} s_i 4^i$; $s_i \in \{-3,-2,-1,0,1,2,3\}$

Process:
1. RSDA Stage 1
Assume that $$W = \sum_{i=0}^{n-1} w_i 4^i$$

is an interim sum, with $w_i$ being the interim sum digit.

$$T = \sum_{i=0}^{n-1} t_i 4^i$$

is a carry, with $t_i$ being the transfer digit to the i_th position. The sum of each two input bits $a_i + b_i = 4 t_{i+1} + w_i$. The quantity $t_{i+1}$ can take on a number of values. If $a_i + b_i > 2$ then $t_{i+1} = 1$. If $a_i + b_i < -2$ then $t_{i+1} = -1$. If $-2 \leq t_{i+1} \leq 2$, then $t_{i+1} = 0$. Thus, $t_i \in \{-1,0,1\}$ and $w_i \in \{-2,-1,0,1,2\}$.
2. RSDA Stage 2
Assume that $$S = \sum_{i=0}^{n-1} s_i 4^i$$

is the sum, with $s_i$ being the sum digit, such that $s_i = w_i + t_i$, $s_i \in \{-3,-2,-1,0,1,2,3\}$.

FIGS. 2a and 2b show an example of the addition of two quaternary redundant numbers; FIG. 2a shows the procedure for adding two quaternary numbers and FIG. 2b shows the equivalent binary expression. In order to simplify shifting of the quaternary number by one bit or three bits, which is necessary in the modular multiplication process of the invention, every quaternary number digit is expressed by two binary bits.

Fast Multiplication by Variable Radix Multiplier Coding

Reducing the number of partial products (PP) calculated can increase the efficiency of a multiplier. Here, fast multiplication by variable radix multiplier coding is presented. This process can efficiently reduce PP and speed up multiplication.

Consider a multiplication $P = X \times Y$, where X is the multiplicand, Y is the multiplier, and P is the product, and X and Y are both n-bit binary redundant numbers which are, for example, 512 bits. If Y can be expressed as $$Y = \sum_{i=0}^{n-1} y_i 2^i,$$

with $y_i \in \{-1,0,1\}$, then the number of necessary $PP_j$ is n. Y can be coded into a radix_4 number $$\hat{Y}, Y = \sum_{j=0}^{[n/2]} \hat{y}_j 4^j$$

with $\hat{y}_j \in \{0, \pm1, \pm2\}$ having a length approximately equal to half the length of Y. The produced $PP_j$ are 0, $\pm X$, $\pm 2X$, respectively, in which $\pm 2X$ can easily be implemented by shifting X. Then the number of $PP_j$ is reduced to n/2. Y can also be expressed as a radix_8 number, $$\hat{Y} = \sum_{j=0}^{[n/3]} \hat{y}_j 8^j$$

with $\hat{y}_j \in \{0, \pm1 \pm2, \pm3, \pm4\}$, reducing the length of Y to n/3. But when $\hat{y}_j$ is evaluated as $\pm 3$, $PP_j$ is not produced by simply shifting, because formed partial products $\pm(1X \pm 2X)$ have two items. To remove the "nonshiftable" digits and increase the efficiency of the multiplier, a multiplication based on variable radix multiplier coding is proposed. The concept of variable radix multiplier coding is basically coding $y_i$ into a radix_8 digit $\hat{y}_j$ except for the case of $\hat{y}_j = \pm 3$, in which $y_i$ is coded into radix_4 digit $\hat{y}_j$.

Consider a multiplication $P = X \times Y$. The multiplicand X, multiplier Y, and product P are all binary redundant numbers, i.e., $x_i, y_i, p_i \in \{-1,0,1\}$. The multiplication is based on the following recurrence: $P_j = r_j P_{j+1} + \hat{y}_j X$, where $P_j$ is the j_th intermediate product, $r_j$ is the variable radix 4 or 8 according to the coding rule, and $\hat{y}_j$ is the j_th digit of $\hat{Y}$ coded from Y.

When the multiplication begins, six digits of Y are scanned from MSB to LSB, i.e., $y_i, y_{i-1}, y_{i-2}, y_{i-3}, y_{i-4}, y_{i-5}$ where $y_{i-3}, y_{i-4}$, and $y_{i-5}$ are the reference digits for considering the carry condition of the lower digits. Every digit of $\hat{y}$ is obtained by radix_8 coding according to the following equation:

$$\hat{y}_j = y_i \times 2^2 + y_{i-1} \times 2 + y_{i-2} + \hat{c}_{j-1} - \hat{c}_j \times r_j,$$

where $\hat{c}_j \in \{-1,0,1\}$ is the carry of the j_th digit $\hat{y}_j$ of $\hat{Y}$, $r_j$ equals 8 and $\hat{y}_j \in \{0, \pm1, \pm2, \pm3, \pm4\}$. When $y_i \times 2^2 + y_{i-1} \times 2 + y_{i-2}$ is greater than 4 or less than −4, $\hat{c}_j$ takes the value 1 or −1, respectively. Otherwise, $\hat{c}_j$ equals 0. The evaluation of $\hat{c}_{j-1}$'s is the same as that of $\hat{c}_j$. Accordingly, the coding rule with radix_8 is derived and shown in table 2, wherein //:condition 1/condition 2/other conditions

* :coding with table 3

TABLE 2

A radix-8 Coding Rule Of The Multiplier

| condition | $y_i$ | $y_{i-1}$ | $y_{i-2}$ | $\hat{c}_j$ | $\hat{y}_j$ | $r_j$ |
|---|---|---|---|---|---|---|
| 2 | −1 | −1 | −1 | −1 | 2/0/1 | 8/8/8 |
|   | −1 | −1 | 0 | −1 | */1/2 | 4/8/8 |
|   | −1 | −1 | 1 | −1 | 4/2/* | 8/8/4 |
|   | −1 | 0 | −1 | −1 | 4/2/* | 8/8/4 |
| others | −1 | 0 | 0 | 0 | */*/−4 | 4/4/8 |
|   | −1 | 0 | 1 | 0 | −2/−4/* | 8/8/4 |
|   | −1 | 1 | −1 | 0 | −2/−4/* | 8/8/4 |
|   | −1 | 1 | 0 | 0 | −1/*/−2 | 8/4/8 |
|   | −1 | 1 | 1 | 0 | 0/−2/−1 | 8/8/8 |
|   | 0 | −1 | −1 | 0 | −2/−4/* | 8/8/4 |
|   | 0 | −1 | 0 | 0 | −1/*/−2 | 8/4/8 |
|   | 0 | −1 | 1 | 0 | 0/−2/−1 | 8/8/8 |
|   | 0 | 0 | −1 | 0 | 0/−2/−1 | 8/8/8 |
|   | 0 | 0 | 0 | 0 | 1/−1/0 | 8/8/8 |
|   | 0 | 0 | 1 | 0 | 2/0/1 | 8/8/8 |
|   | 0 | 1 | −1 | 0 | 2/0/1 | 8/8/8 |
|   | 0 | 1 | 0 | 0 | */1/2 | 4/8/8 |
|   | 0 | 1 | 1 | 0 | 4/2/* | 8/8/4 |
|   | 1 | −1 | −1 | 0 | 2/0/1 | 8/8/8 |
|   | 1 | −1 | 0 | 0 | */1/2 | 4/8/8 |
|   | 1 | −1 | 1 | 0 | 4/2/* | 8/8/4 |
|   | 1 | 0 | −1 | 0 | 4/2/* | 8/8/4 |
|   | 1 | 0 | 0 | 0 | */*/4 | 4/4/8 |

TABLE 2-continued

A radix-8 Coding Rule Of The Multiplier

| condition | $y_i$ | $y_{i-1}$ | $y_{i-2}$ | $\hat{c}_j$ | $\hat{y}_j$ | $r_j$ |
|---|---|---|---|---|---|---|
| 1 | 1 | 0 | 1 | 1 | -2/-4/* | 8/8/4 |
|   | 1 | 1 | -1 | 1 | -2/-4/* | 8/8/4 |
|   | 1 | 1 | 0 | 1 | -1/*/-2 | 8/4/8 |
|   | 1 | 1 | 1 | 1 | 0/-2/-1 | 8/8/8 |

TABLE 3

A radix-4 Coding Rule Of The Multiplier

| $y_i$ | $y_{i-1}$ | $\hat{c}_j$ | $\hat{y}_j$ |
|---|---|---|---|
| -1 | -1 | — | — |
| -1 | 0 | 0 | -1/—/-2 |
| -1 | 1 | 0 | —/-2/-1 |
| 0 | -1 | 0 | —/-2/-1 |
| 0 | 0 | — | — |
| 0 | 1 | 0 | 2/—/1 |
| 1 | -1 | 0 | 2/—/1 |
| 1 | 0 | 0 | —/1/2 |
| 1 | 1 | — | — |

//:condition 1/condition 2/other conditions
:Never occurs

The first column in table 2 lists "condition 1", "condition 2", and "other conditions". When the value of three continuous bits satisfy Condition 1, i.e., $y_i \times 2^2 + y_{i-1} \times 2 + y_{i-2} > 4$ then, $\hat{c}_j$ equals 1. Likewise, when the three continuous bits satisfy Condition 2 i.e., $y_i \times 2^2 + y_{i-1} \times 2 + y_{i-2} < -4$ then, $\hat{c}_j$ equals -1. In other cases, $\hat{c}_j$ equals 0. For example, $y_i$, $y_{i-1}$, and $y_{i-2}$ are evaluated as -1, -1, and -1, respectively. Then $\hat{y}_j$ equals $\hat{y}_j = (-1) \times 2^2 + (-1) \times 2 + (-1) + \hat{c}_{j-1} - \hat{c}_j \times r_j$. Because $-1 \times 2^2 - 1 \times 2 - 1 = -7$ is less than -4, $\hat{c}_j$ takes the value -1. Assuming that the three reference digits, $y_{i-3}$, $y_{i-4}$ and $y_{i-5}$, satisfy Condition 1, $\hat{c}_{j-1}$ is evaluated as 1. Then $\hat{y}_j = -7 + 1 - (-1) \times 8 = 2$.

When $\hat{y}_j$ equals 3 or -3, two partial will produced. So 3 or -3 is replaced by an asterisk in Table 2, which means Table 3 is used for radix$_{13}$4 coding. In this case, only five bits of Y are scanned from MSB to LSB, i.e. $y_i$, $y_{i-1}$, $y_{i-2}$, $y_{i-3}$, $y_{i-4}$, where $y_{i-2}$, $y_{i-3}$, and $y_{i-4}$ are the reference digits. The quantity $r_j$ is evaluated as 4. The digits of $\hat{Y}$ are obtained according to the following equation:

$$\hat{y}_j = y_i \times 2 + y_{i-1} + \hat{c}_{j-1} - \hat{c}_j \times r_j,$$

where $\hat{c}_j \in \{-1, 0, 1\}$ is the carry of the $\hat{y}$'s j__th digit $\hat{y}_j$, $r_j$ equals 4 and $\hat{y}_j \in \{0, \pm 1, \pm 2\}$. The coding rule is derived and the details are shown in table 3. The process includes the following steps:

A multiplicand X (a binary redundant number) and a multiplier Y (an n-bit binary redundant number) are provided as inputs. The desired output is the product $P = X \times Y$ (a binary redundant number). Variables i and j are set such that j=m (m is an arbitrary integer) and i=n-1. The m+1__th intermediate product $P_{m+1}$ is set to zero. For values of $i \geq 0$ $r_j$, $\hat{y}_j = code(y_i, y_{i-1}, y_{i-2}, y_{i-3}, y_{i-4}, y_{i-5})$, according to variable radix multiplier coding described above. The j__th intermediate product $P_j = r_j P_{j+1} + \hat{y}_j X$, $i = i - \log_2 r_j$ (scan bits of Y from MSB to LSB), and j=j-1. When this process is complete, $P = P_j \times 2^{i+1}$ is the product.

The following example is used to explain the procedure for multiplication by variable radix multiplier coding in detail. The following numbers are provided as inputs: X=11 00 11 01 10, and Y=0 10,1$\bar{1}$ 01 0$\bar{1}$ $\bar{1}$0. Thus, n=11. Once again, the desired output is P=X×Y. Variables i and j are initially set such that j=m=4 (m takes value 4 as a mark) and i=n-1=11-1=10. The intermediate product $p_{m+1}$ is thus $p_5=0$.

The variable radix code $r_4=8$ (radix-8), $\hat{c}_4=0$, $\hat{c}_3=0$, $\hat{y}_4=2$ ($\hat{y}_j = y_i \times 2^2 + y_{i-1} \times 2 + y_{i-2} + \hat{c}_{j-1} - \hat{c}_j \times r_j$). The partial product $P_4 = r_4 P_5 + \hat{y}_4 X = \hat{y}_4 X = 11\ 001\ 101\ 100$, $i = 10 - \log_2 r_4 = 10 - 3 = 7$, and j=3.

Thus, in the next step, $r_3=8$ (radix-8), $\hat{c}_3=0$, $\hat{c}_2=0$, and $\hat{y}_3=2$ ($\hat{y}_j = y_i \times 2^2 + y_{i-1} \times 2 + y_{i-2} + \hat{c}_{j-1} - \hat{c}_j \times r_j$). The partial product $P_3 = r_3 P_4 + \hat{y}_3 X = 011\ 001\ 101\ 100\ 000\ (r_3 P_4) + 011\ 001\ 101\ 100$ ($\hat{y}_3 X$)=011 100 111 001 100=10$\bar{1}$ 100 111 010 $\bar{1}$00=00$\bar{1}$ 010 110 000 $\bar{1}$00+100 010 001 010 000, $i = 7 - \log_2 r_3 = 7 - 3 = 4$, and j=2, where $001100_2 = 12 = 16 - 4 = 010\ \bar{1}00_2$; $011_2 = 3 = 4 - 1 = 10\ \bar{1}_2$.

In the next step, $r_2=4$ (radix-4), $\hat{c}_2=0$, $\hat{c}_1=-1$, and $\hat{y}_2=1$ ($\hat{y}_j = y_i \times 2 + y_{i-1} + \hat{c}_{j-1} - \hat{c}_j \times r_j$). The partial product $P_2 = r_2 P_3 + \hat{y}_2 X = 11\ 10\ 01\ 11\ 00\ 11\ 00\ 00(r_2 P_3) + 00\ 00\ 00\ 11\ 00\ 11\ 01\ 10(\hat{y}_2 X) = 11\ 10\ 10\ 10\ 01\ 10\ 01\ 10 = 00\ 01\ 0\bar{1}\ 10\ 10\ 10\ 01\ 10\ 01\ 10 = 00\ 01\ 0\bar{1}\ 10\ 01\ 10\ 01\ 10\ 01\ 10 + 00\ 00\ 00\ 00\ 01\ 00\ 00\ 00\ 00\ 00$, $i = 4 - \log_2 r_2 = 4 - 2 = 2$, and j=1=2, where $11_2 = 3 = 4 - 1 = 01\ 0\bar{1}_2$.

In the next step, $r_1=8$ (radix-8), $\hat{c}_1=-1$, $\hat{c}_0=0$, and $\hat{y}_1=2$ ($\hat{y}_j = y_i \times 2^2 + y_{i-1} \times 2 + y_{i-2} + \hat{c}_{j-1} - \hat{c}_j \times r_j$). The partial product $P_1 = r_1 P_2 + \hat{y}_1 X = 001\ 110\ 101\ 001\ 100\ 110\ 000(r_1 P_2) + 011\ 001\ 101\ 100 = 001\ 110\ 101\ 100\ 110\ 011\ 100 = 010\ \bar{1}10\ 101\ 100\ 110\ 100\ \bar{1}00 = 010\ \bar{1}10\ 101\ 010\ 101\ 010\ 100 + 000\ 000\ 000\ 010\ 001\ 010\ 000$, $i = 2 - \log_2 r_1 = 2 - 3 = -1$, and j=0, where $011\ 100_2 = 28 = 32 - 4 = 100\ \bar{1}00_2$; $001\ 110_2 = 14 = 16 - 4 + 2 = 010\ \bar{1}10_2$.

Thus, $P = P_1 \times 2^{-1+1} = P_1 = 01\ 11\ 01\ 01\ 10\ 01\ 10\ 01\ 11\ 00 = 10\ 11\ 01\ 01\ 10\ 01\ 10\ 10\ 01\ 00$.

Estimation of Variable Radix Multiplier Coding

As mentioned above, the number of $PP_j$ produced by the radix__r coded multiplier $\hat{y}$ is $(1+t)n/\log_2 r$, where n is the number of digits in the radix__2 representation of Y and t is the probability of a nonshiftable digit (t=0 for radix__4 and statistically t=0.25 for radix__8), resulting in n/2 for a radix__4 multiplier and 5n/12 for a radix__8 multiplier. The number of $PP_j$ produced by a variable radix coded $\hat{y}$ is $tn/2 + (1-t)n/3$.

Figure 3:
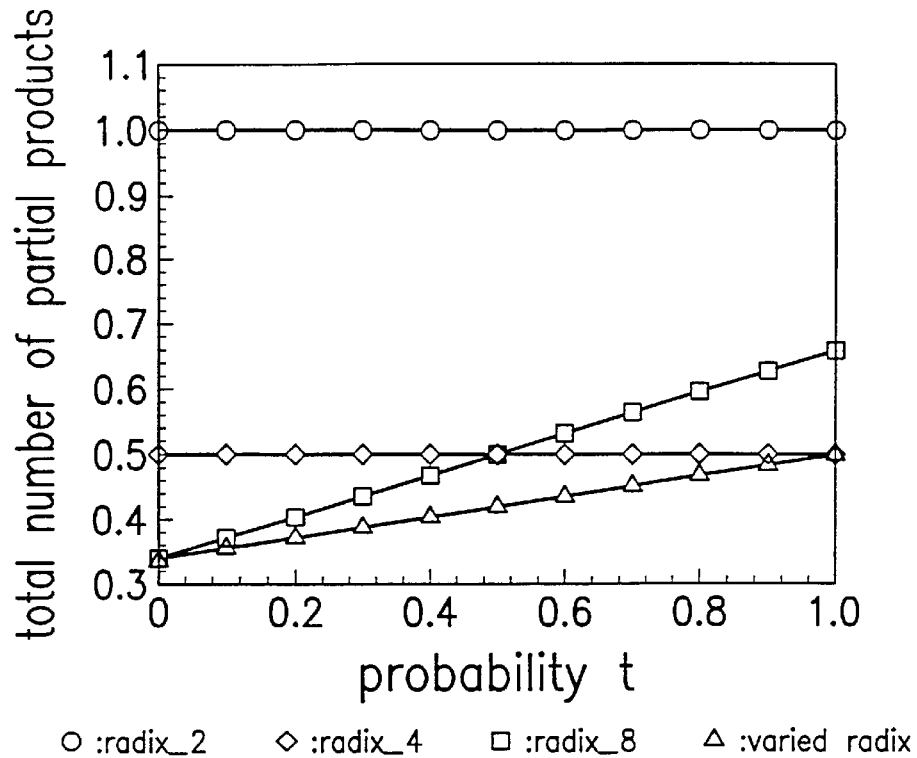
FIG. 3 is a graph showing the number of partial products normalized by number of partial products produced by a radix_2 multiplier, plotted as a function of the probability t for products produced by different radix_n multipliers.

FIG. 3 shows the number of partial products normalized by the number of partial products produced by a radix__2 multiplier, plotted as a function of the probability t. In the range of t shown, the number of partial products generated by variable radix multiplier coding is the least among the coding schemes shown. Statistically, t equals ¼ for a radix__8 multiplier. The variable radix multiplier reduces the number of partial products by (n/2-3n/8)/(n/2)=25% for the radix__4 multiplier and by (5n/12- 3n/8)/(5n/12)=10% for the radix__8 multiplier. With t varying from 0 to 0.5, the number of partial products of a radix__8 multiplier increases, but still remains smaller than those of the radix__4 multiplier. When t is greater than ½, which is known as a bad condition, the number of partial products of the radix__8 multiplier is greater than that of the radix__4 multiplier. Under such bad conditions, variable radix multiplier coding can overcome radix__8 multiplier coding's drawback and provide results superior to radix__4 multiplier coding. On the other hand, in variable radix multiplier coding, the partial product produced by $\hat{y}_j$ is always one item. Therefore, the hardware realization is more regular and simpler than for radix__8 multiplier coding. With multiplication based on a radix__16 multiplier, the number of partial products is $(1+t)n/4$, where t is the probability of $\hat{y}_j$ being evaluated as ±3, ±5, ±6, or ±7, all of which produce two item (nonshiftable) partial products. The mean value for t is ½. Therefore, the number of partial products is 3n/8, which is the same as for multiplication based on a variable radix multiplier. However, radix_16 multiplier coding is much more complicated, and is therefore more difficult to implement. With even higher level radix multiplier coding, the partial products produced by one $\hat{y}_j$ digit may be even more than two items, which makes the coding implementation too complicated and therefore impractical.

Modular Reduction Based on Precomputation

The invention uses a precomputation technique to save storage space. A modular reduction operation H mod Q is performed, where H is an h-bit binary number, Q is an n-bit binary number, and k=h−n>1. The method includes the following steps.

The value $a_e=2^n \times e \times d$ mod Q is precomputed for e=1 to $[(2^k-1)/d]$, where d is a predetermined integer. The precomputed results $a_e$ are stored in a look-up table memory. The value $b_g=2^n \times g$ mod Q is precomputed for g=1 to d−1. The precomputed results $b_g$ are stored in the look-up table memory. A first modular reduction is performed according to the precomputed results $a_e$ in the look-up table memory. The steps of the first modular reduction include determining u=H div $2^n$ and v=u div d, and calculating H'=H mod $2^n$+(u mod d) $2^n+a_v$. A second modular reduction is then performed using the precomputed results $a_1$ and $b_v$ stored in the look-up table memory. First, v'=H'div $2^n$ is determined. The second modular reduction is then H"=H' mod $2^n+a_1$, when v'=d, or H"=H' mod $2^n+b_v$, when v'≠d. The second modular reduction is then adjusted to solve for the modular reduction H mod Q as follows: H mod Q=H"−2Q when H"≧2Q, H mod Q=H"−Q when 2Q>H"≧Q, and H mod Q=H" when H"<Q.

Figure 4:
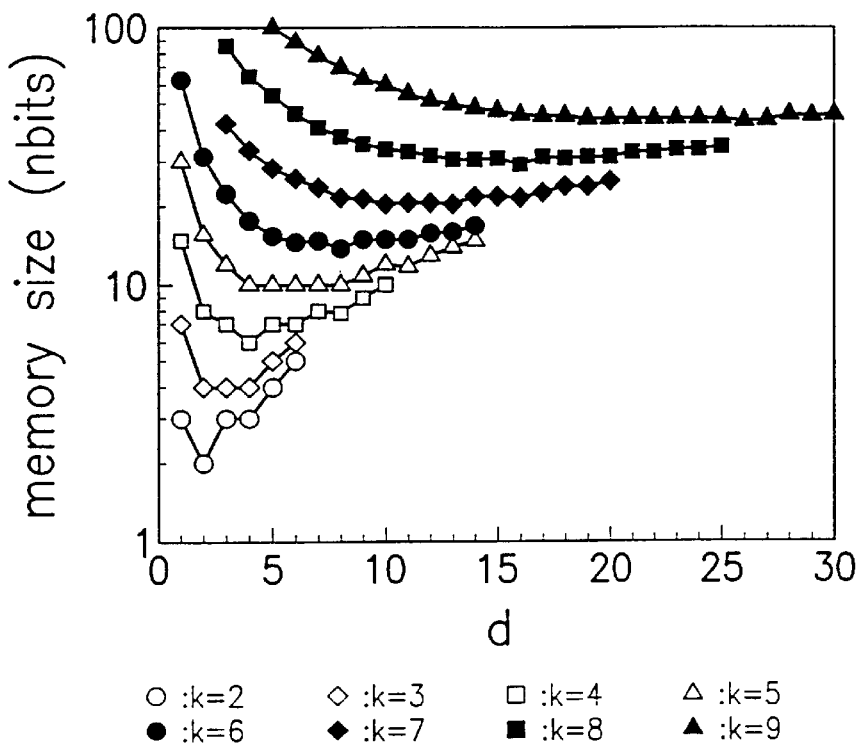
FIG. 4 is a graph plotting the size of required memory as a function of d for different values of k.

Referring to FIG. 4, consider $a_e=2^n \times e \times d$ mod Q, with e=1, 2, ..., $[(2^k-1)/d]$ and where d is an integer which has an optimal value of $[(2^k-1)^{1/2}]+1$ calculated by differential analysis, and $b_g=2^n \times g$ mod Q, with g=1,2 ..., d−1. The $[(2^k-1)/d]d+d-1$ precomputed results $a_e$ and $b_g$ (n bits) are stored in a look-up table memory. FIG. 4 is a graph plotting the size of required memory as a function of d for various values of k. For constant values of k, a proper d can be selected to minimize $[(2^k-1)/d]+d-1$.

In this way, the required memory size is reduced to $[(2^k-1)/d]+d-1$. The cost of using the precomputation technique of the invention is that one more step is required to compute the modular reduction. However, fast modular multiplication may be performed using only the first modular reduction. Therefore, efficiency may not be reduced at all, while the required memory size is greatly reduced.

A Method of Modular Multiplication

According to the invention, the precomputation modular reduction technique is performed in combination with variable radix multiplier coding, resulting in a method of modular multiplication in which modular reduction is performed during multiplication.

The method of modular multiplication includes three steps: precomputation, modular multiplication and adjustment. In the precomputation procedure, the precomputing parameter d is evaluated. The required memory size is [8d+11]/d+d−1, which will be shown below. As mentioned above, only the first modular reduction is performed to increase efficiency. At the end of modular multiplication, the result |P| may still be larger than Q, so an adjusting step is performed to remove or add Q or 2Q from the intermediate product P, keeping |P|<Q. Note that $P_{max}$ is the most significant nonzero bit of P. The inputs to the system are multiplicand X (n-bit binary redundant number), multiplier Y (n-bit binary redundant number), and module Q (n-bit binary number).

|Y|<Q,|X|<Q

The desired output is P=X×Y mod Q.

First, a precomputation is performed. With d set to 4 and for e=1 to [(8×d+11)/d], $a_e=2^n \times e \times d$ mod Q. Next, $b_g$ is calculated for g=1 to d−1 as $b_g=2^n \times g$ mod Q. Modular multiplication is then performed. The variable j is set to m (m is an arbitrary integer), i=n−1, and P'$_{m+1}$=0. For i≧0, variable radix multiplier coding is performed such that $r_j$, $\hat{y}_j$=code($y_i,y_{i-1},y_{i-2},y_{i-3},y_{i-4},y_{i-5}$). Partial product addition is then performed to determine a partial product $P_j=r_j P_{j+1}'+\hat{y}_j X$. Variables for the partial modular reduction are then calculated as u=$P_j$ div $2^n$ and v=[$P_j$div $2^n$/d], and the partial modular reduction is calculated as $P_j'=P_j$mod$2^n$+(u mod d)$2^n+a_v$. The variable i is then set to i−log$_2 r_j$ and j=j−1. The final partial modular reduction is then determined to be $P_j'=P_j' \times 2^{i+1}$. The variable v is then set to $P_j'$ div $2^n$. If v=d, $P=P_j'$ mod $2^n+a_1$; otherwise $P=P_j'$ mod $2^n+b_v$. An adjustment is then performed. That is, if |P|≧2Q, P=P−2Q×$P_{max}$. Further, if 2Q>|P|≧Q, P=P−Q×$P_{max}$. If |P|<Q, no adjustment is made.

The maximum value of |$P_j$|div $2^n$ will never be greater than 8d+11, as shown below. That is, if $P_j=r_j P_{j+1}'+\hat{y}_j X$, and $P_j'=P_j$ mod Q, then |$P_j$|div $2^n$≦8d+11. For u=$P_j$ div$2^n$d and v=[u/d], $P_{j+1}'=P_{j+1}$ mod$2^n$+(u mod d) $2^n+a_v$. But |u|mod d≦d−1 and if |$P_{j+1}$| mod $2^n$≦$2^n$−1 and |$a_v$|≦Q−1≦$2^n$−2, then |P'$_{j+1}$|≦(d−1)$2^n+2^n-1+2^n-2$=(d+1)$2^n$−3. Further, if $r_j$≦8, |$\hat{y}$|≦4, and |X|≦Q−1≦$2^n$−2, then |$P_j$|≦$r_j$|P'$_{j+1}$|+|$\hat{y}_j$X|. Thus, |$P_j$|≦(8d+8)$2^n$−24+4($2^n$−2)=(8d+12)$2^n$−32, and so |$P_j$|div $2^n$≦8d+11.

Figure 5:
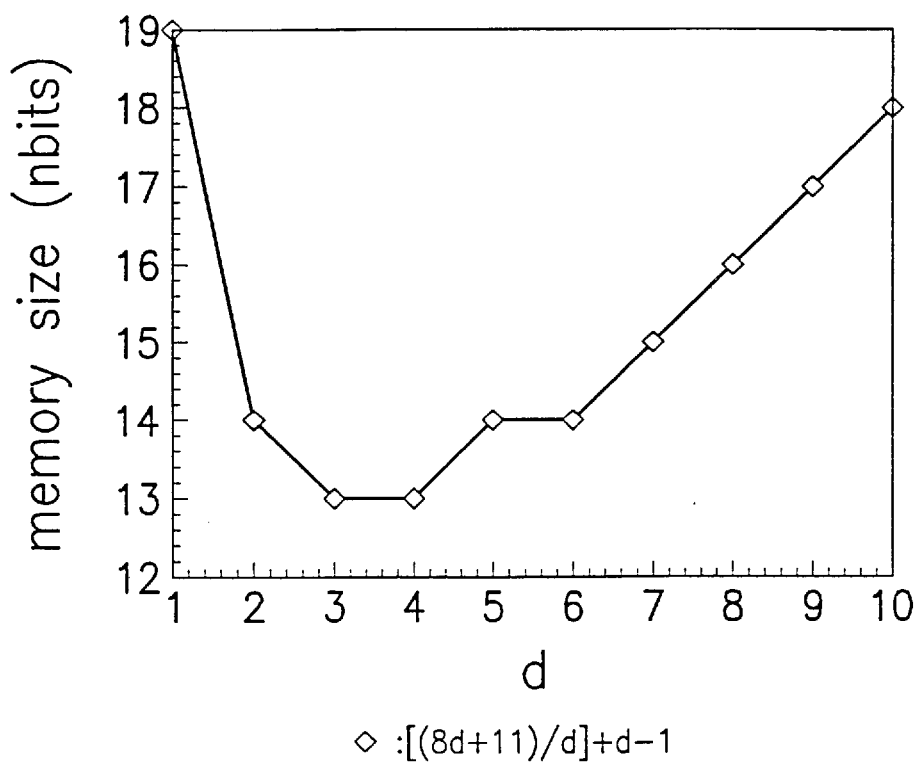
FIG. 5 is a graph plotting the memory size [(8d+11)/d]+ d−1 as a function of d.

Therefore, the required memory size is [(8d+11)/d]+d−1. With optimal d, the required memory size can be minimized. Referring to FIG. 5, the memory size [(8d+11)/d]+d−1 is plotted as a function of d. From the figure, we can see the that optimized value of d is 3 or 4, which can also be calculated by differential analysis.

A Modular Multiplication Device and Application to RSA Cryptosystem

Figure 6:
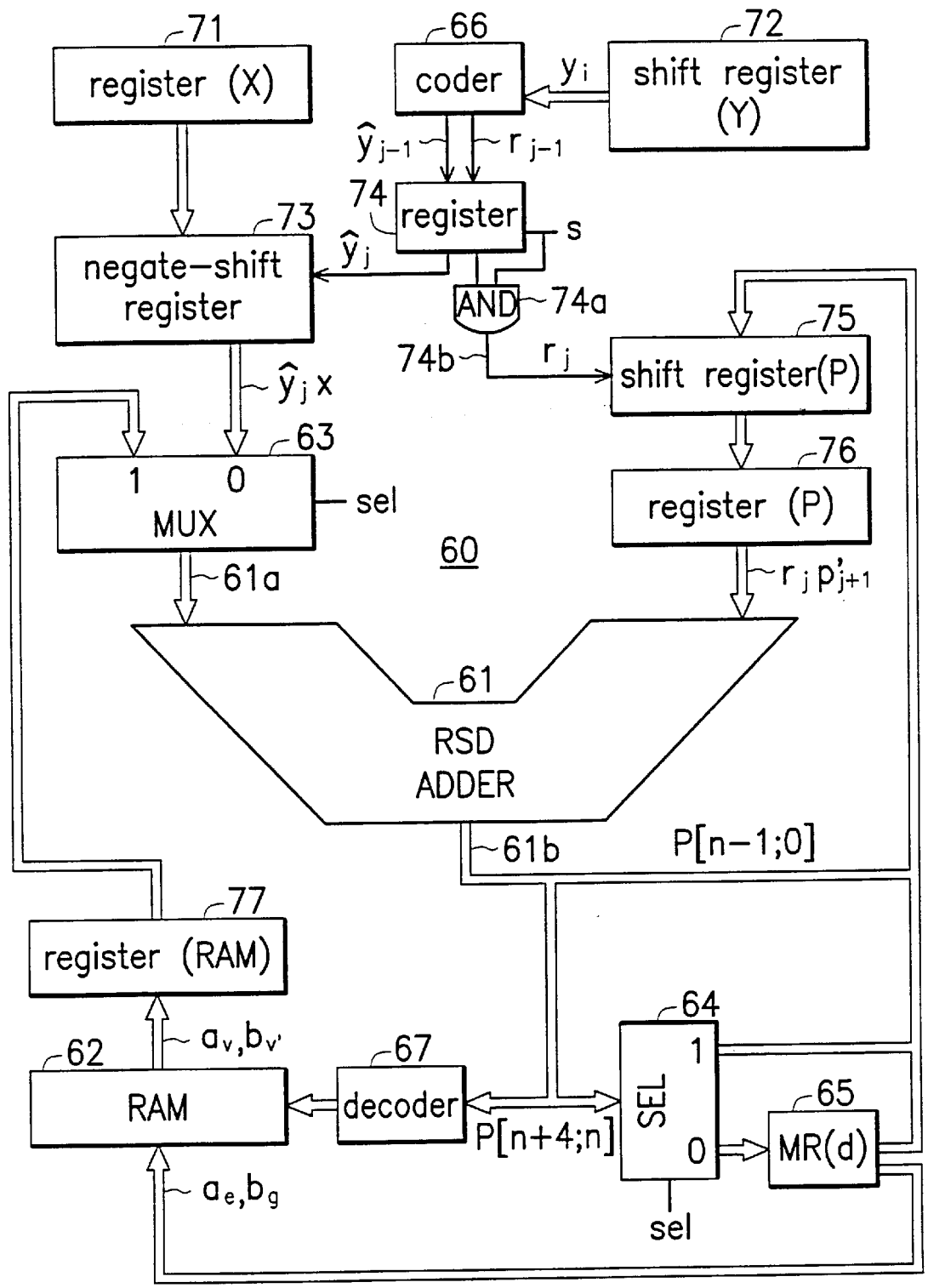
FIG. 6 is a block diagram of a modular multiplier.

A block diagram of a modular multiplication device 60 based on the technique described above is shown in FIG. 6. Here, the precomputation of the modular reduction for Q has been completed and the results have been stored in a RAM. The logic shown in FIG. 6 carries out recursive multiplication-addition and modular reduction.

The modular multiplication device 60 includes seven registers 71–77, an RSD adder 61, a RAM 62, a multiplexer MUX 63, a selector SEL 64, a modular reduction circuit MR(d) 65, a coder 66, and a decoder 67. The registers 71–77 store the redundant binary numbers X, Y, P, the data from RAM 62, and the coding result $\hat{y}$ and $r_j$. The RAM 62 stores the precomputation result $a_e$, $b_g$. The MUX 63, controlled by a signal "sel", is used to select data from register(X) 7 1( through the register 73) or RAM 62 (through the register 77). When the signal sel is low, the data from register(X) 71 is provided to one input 61a of the RSD adder 61, which indicates a partial product adding procedure is taking place. When the signal sel is high, the data from the RAM 62 is provided to the input 61a of the RSD adder 61, indicating a modular reduction procedure. The partial product $\hat{y}_j$ X is produced by the negate-shift register 73 under the control of the signal $\hat{y}_j$ used in the register 74. The decoder 67 provides the address of the RAM 62 according to the five most significant bits of the intermediate product $P_j$, i.e., P[n+4:n] ($P_{n+4}$, $P_{n+3}$, $P_{n+2}$, $P_{n+1}$ and $P_n$), because $P_j$ div $2^n$ is not larger than 8d+11 when d is an optimal value of 3 or 4. The selector SEL64 is also controlled by the signal sel. When sel is high, the addition result 61b from the RSD Adder 61 feeds back to the shift register(P) 75, and when sel is low, the five highest digits P[n+4:n] are modularly reduced by d through the circuit MR(d) 65 before feeding back, where d is a predetermined integer. The coder circuit 66 of the shift register(Y) 72 codes the bits $y_i$ of Y into the digits $\hat{y}_j$ and $r_j$ according to Tables 1 and 2. The signal $r_j$ shifts the intermediate product P' two or three bits to the left according to $r_j$=4 or 8, respectively at the shift register (P) 75. In order to shorten the clock period, the calculation of $\hat{y}_j$ is performed in the previous period concurrently with performing the j+1_th addition and modular reduction.

Figure 7:
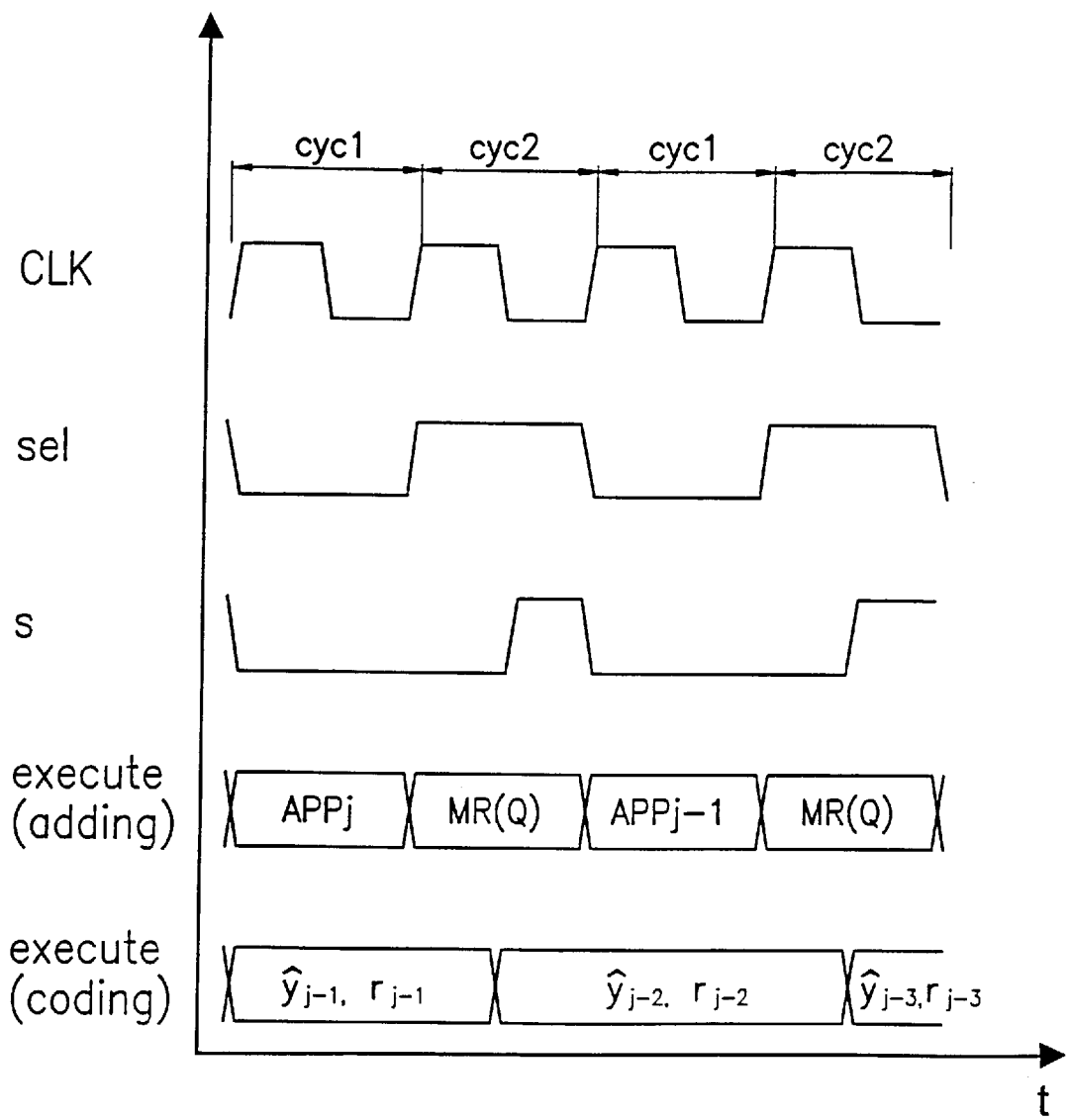
FIG. 7 is a timing diagram of the modular multiplier of FIG. 6.

A timing diagram for the modular multiplication device 60 is shown in FIG. 7. The signal CLK is a clock. One processing period consists of two clock cycles, cyc 1 and cyc 2. The clock cycle cyc 1 clocks the addition of $PP_j$ ($APP_j$), and cyc 2 clocks the modular reduction (MR(Q)). The signal "sel" and "s" are controlling signal generated by an RSA cryptosystem 100 (shown in FIG. 8). During cyc 1, the signal "sel" is low. $P_j = r_j P_{j+1}' + \hat{y}_j X$ is performed by the RSD Adder 61, where $\hat{y}_j X$ is a partial product from the negate-shift register 73 and $r_j P_{j+1}'$ is an intermediate product from register(P) 76. The addition result 61b ($P_j$) from the RSD Adder 61 feeds directly back to the shift register(P) 75, except for the five highest digits P[n+4:n], which are first modularly reduced by d.

Therefore, performing the $P_j' = P_j$ mod $2^n$+(u mod d) $2^n$ procedure in the modular multiplication scheme described above is easily accomplished. The five highest digits are concurrently decoded by the decoder 67, which selects the proper modular value $a_v$ or $b_v$, from the precomputation result ($a_e$, $b_g$) stored in the RAM 62 to provide to the register (RAM) 77.

During cyc 2, the signal "sel" goes high. Without any shifting operation, the data from shift register(P) 75 enters the register(P) 76, because the control signal "s" is low and the output 74b of the AND gate 74a is low. Then $P_j' = P_j + (a_v, b_v)$ is performed by the RSD Adder 61, where ($a_v, b_v$) is provided by the register (RAM) 77, and the addition result 61b ($P_j'$) is fed back to the shift register (P) 75. When the signal s goes high, the coding results $\hat{y}_{j-1}$ and $r_{j-1}$ are generated by the register 74 and produce $\hat{y}_{j-1} X$ and $r_{j-1} P_j'$, respectively. At the same time, the coder 66 begins to calculate $\hat{y}_{j-2}$ and $r_{j-2}$. This represents one period of the modular multiplication.

With this design, in a two clock cycle period, a modular reduction and an intermediate multiplication are completed serially. These operations can thus be completed in 30 ns with 2 um CMOS technology. The mean time for completing n-bit modular multiplication is 3n/8 period. Therefore, 512-bit modular multiplication can be completed in about 0.03 us×⅜=5.76 us.

Figure 8:
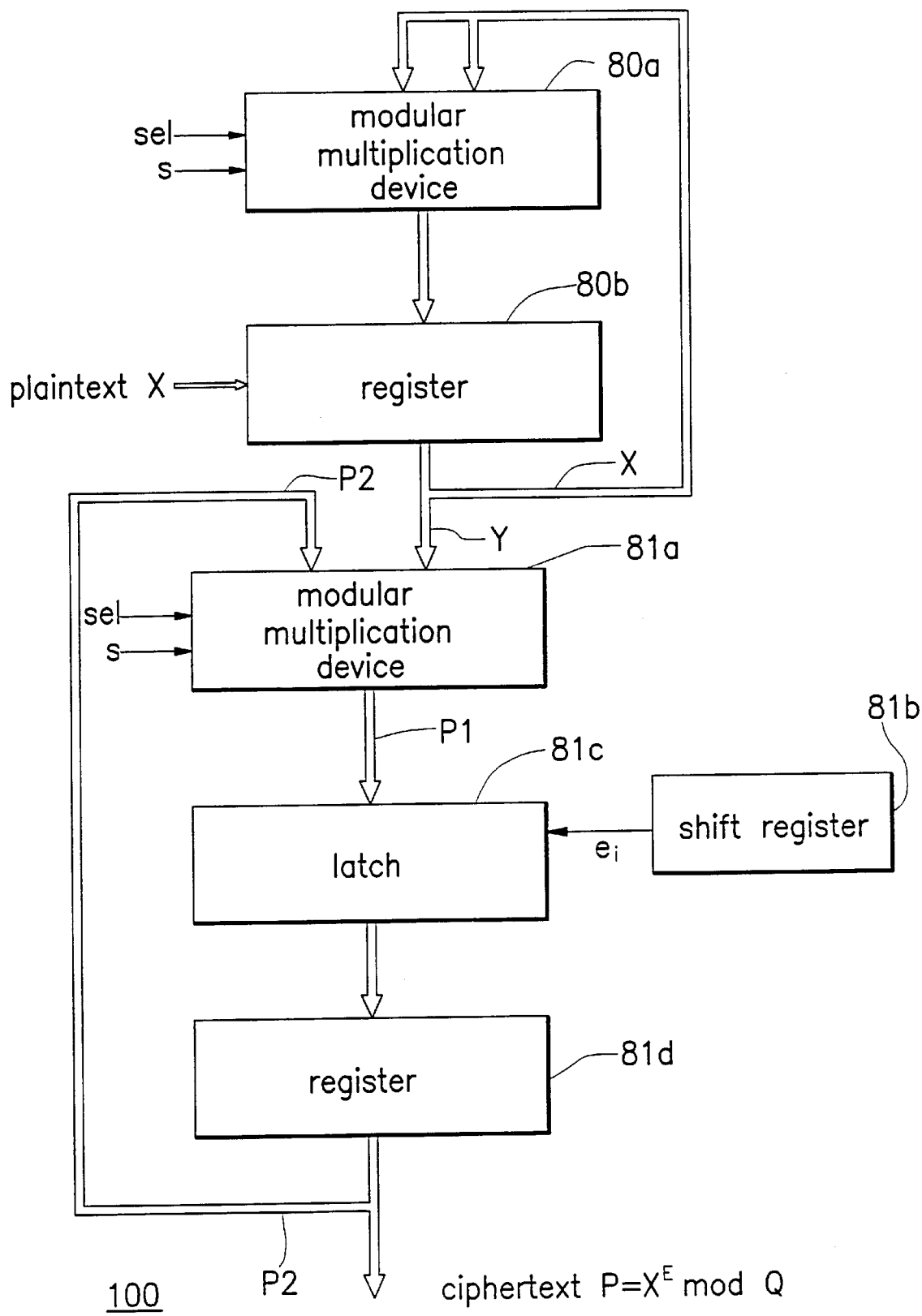
FIG. 8 is a block diagram of an RSA cryptosystem.

Referring to FIG. 8, this modular multiplication devices 80a, 81a can be used as a kernel in an RSA cryptosystem 100. In an RSA public key cryptosystem, $P = X^E$ mod Q is performed, where X is plaintext, P is ciphertext, exponent $E = e_{n-1} e_{n-2} \ldots e_i \ldots e_1 e_0$ is a key, and Q is the module, all quantities being n-bit numbers. For example, the RSA cryptosystem 100 includes modular multiplication devices 80a, 81a, registers 80b, 81d, a latch 81c and a shift register 81b. First, the input plaintext X is sent to the modular multiplication device 80a through the register 80b. Then the modular multiplication device 80a performs the operation X*X mod Q and provides the result Y of X*X mod Q to the register 80b, where the initial value stored in register 80b is X and the initial values stored in the register 81d and latch 81c are both 1. The result Y from the register 80b and a feedback signal P2 from the register 81d are provided to the modular multiplication device 81a together. Then the modular multiplication device 81a performs the operation P2*Y mod Q and provides the result P1 of P2*Y mod Q to the latch 81c. The shift register 81b generates the bit $e_i$, in sequence from the LSB $e_0$ to the MSB $e_{n-1}$, of the exponent E as a controlling signal to the latch 81c. The latch 81c provides the result P1 to the register 81d when the controlling signal $e_i$=1. Otherwise, the latch 81c latches the result P1 when the controlling signal $e_i$=0. The register 81d provides the result P1 as the feedback signal P2 to the modular multiplication device 81a when the controlling signal $e_i$ from the shift register 81b is not the MSB $e_{n-1}$ of the exponent E. Otherwise, the register 81d generates the ciphertext $P = X^E$ mod Q when the controlling signal $e_i$ from the shift register 81b is the MSB $e_{n-1}$ of the exponent E.

The mean modular multiplication time is n+n/2=3n/2 using the famous square-multiplication algorithm, where n/2 is the number of 1 in the exponent E. To improve efficiency, the second modular reduction step and the adjustment procedure are not included in the modular multiplication. These steps are performed after completing the 3n/2 times modular multiplication. As stated above, 512-bit modular multiplication can be completed in 5.76 us. Therefore the 512-bit modular exponentiation can be performed in 5.76×(3n/2)= 8.64×512=4.424 ms. This corresponds to an encryption throughput of about 115.74 kbit/s.

The invention has been described with exemplary preferred embodiments. However, it is to be understood that the scope of the invention is not limited to the disclosed preferred embodiments. To the contrary, it is intended to cover various modifications and similar arrangements. The scope of the claims, therefore, should be accorded the broadest interpretation so as to encompass all such modifications and arrangements.

What is claimed is:

1. A device for performing a modular multiplication, comprising:

an X register for storing an n-bit redundant binary multiplicand X and for shifting out the multiplicand X;

a Y shift register for storing an n-bit redundant binary multiplier Y and for shifting out bits $y_j$ of the multiplier Y;

a coder, for receiving $y_j$ from said Y shift register and for coding $y_j$ into $$\hat{Y} = \sum_{j=0}^{[n/\log_2 r_j]} \hat{y}_j r_j^j$$

with $r_j \in \{4,8\}$, $\hat{y}_j \in \{0, \pm 1, \pm 2, \pm 3, \pm 4\}$ and for generating $\hat{y}_j$ and an additional register for storing and for generating $\hat{y} y_j$ and $r_j$ according to a control signal;

a negate-shift register for receiving $\hat{y}_j$ from said additional register and the multiplicand X shifted out by said X register and for generating a partial product $\hat{y}_j X$;

an RSD adder, for receiving a first input and a second input and for adding the first input to the second input to generate an addition result;

a selector, for receiving the five most significant bits of addition result P[n+4:n] and for generating P[n+4:n] at a first output or at a second output, according to a select signal;

a modular reduction circuit, connected to the first selector output for performing modular reduction in d, wherein d is a predetermined integer, and for generating precomputation results and a modular reduction result based on P[n+4:n];

a P shift register, connected to the adder, the second selector output, and a modular reduction circuit output, for receiving P[n+4:n] or the modular reduction result, according to the select signal, and further for receiving $r_j$, for generating an intermediate product $r_j P'_j$;

a P register for receiving $r_j P'_j$ and for generating $r_j P'_{j+1}$ and for providing $r_j P'_{j+1}$ to the adder as the second output;

a RAM for receiving the precomputation results and for receiving P[n+4:n] as an address for selectively generating the precomputation results;

a RAM register for receiving the selectively generated precomputation results and for generating the registered precomputation results; and a multiplexer, having a first input for receiving $\hat{y}_j X$ from the negate-shift register and a second input for receiving the registered precomputation results, for selective provision of $\hat{y}_j X$ or the registered precomputation results as the first input of the adder, according to the select signal;

wherein the RSD adder performs the addition $P_j = r_j P'_{j+1} + \hat{y}_j X$ when the select signal is a logic low, where $\hat{y}_j X$ is the partial product generated by the negate-shift register, $r_j P'_{j+1}$ is an intermediate product generated by the P register, and $P_j$ is the addition result; and wherein the RSD adder provides all but the five most significant bits of the addition result directly to the P shift register.

2. The device as claimed in claim 1, wherein said coder encodes $y_i$ by variable radix-r multiplier coding into radix_8 digit $\hat{y}_j$, except when $\hat{y}_j = \pm 3$, in which case $y_i$ is coded into radix_4 digit $\hat{y}y_j$.

3. The device as claimed in claim 1, wherein said coder encodes $y_i$ into $\hat{y}_j$ and $r_j$ according to a first table representing radix-8 coding rules for the multiplier $\hat{y}_j = y_i \times 2^2 + y_{i-1} \times 2 + y_{i-2} + \hat{c}_{j-1} - \hat{c}_j \times r_j$, where $\hat{c}_j \in \{-1,0,1\}$ is the carry of the j__th digit $\hat{y}_j$ of $\hat{y}$, $r_j$ equals 8 and $\hat{y}_j \in \{0, \pm 1, \pm 2, \pm 3, \pm 4\}$, and a second table representing a radix-4 coding rules for the multiplier $\hat{y}_j = y_i \times 2^2 + y_{i-1} \times 2 + y_{i-2} + \hat{c}_{j-1} - \hat{c}_j \times r_j$, where $\hat{c}_j \in \{-1,0,1\}$ is the carry of the $\hat{Y}$'s j__th digit $\hat{y}_j$, $r_j$ equals 4 and $\hat{y}_j \in \{0, \pm 1, \pm 2\}$: the first table

| condition | $y_i$ | $y_{i-1}$ | $y_{i-2}$ | ĉ | $\hat{y}_j$ | $r_j$ |
|---|---|---|---|---|---|---|
| 2 | -1 | -1 | -1 | -1 | 2/0/1 | 8/8/8 |
|   | -1 | -1 | 0 | -1 | */1/2 | 4/8/8 |
|   | -1 | -1 | 1 | -1 | 4/2/* | 8/8/4 |
|   | -1 | 0 | -1 | -1 | 4/2/* | 8/8/4 |
| others | -1 | 0 | 0 | 0 | */*/-4 | 4/4/8 |
|   | -1 | 0 | 1 | 0 | -2/-4/* | 8/8/4 |
|   | -1 | 1 | -1 | 0 | -2/-4/* | 8/8/4 |
|   | -1 | 1 | 0 | 0 | -1/*/-2 | 8/4/8 |
|   | -1 | 1 | 1 | 0 | 0/-2/-1 | 8/8/8 |
|   | 0 | -1 | -1 | 0 | -2/-4/* | 8/8/4 |
|   | 0 | -1 | 0 | 0 | -1/*/-2 | 8/4/8 |
|   | 0 | -1 | 1 | 0 | 0/-2/-1 | 8/8/8 |
|   | 0 | 0 | -1 | 0 | 0/-2/-1 | 8/8/8 |
|   | 0 | 0 | 0 | 0 | 1/-1/0 | 8/8/8 |
|   | 0 | 0 | 1 | 0 | 2/0/1 | 8/8/8 |
|   | 0 | 1 | -1 | 0 | 2/0/1 | 8/8/8 |
|   | 0 | 1 | 0 | 0 | */1/2 | 4/8/8 |
|   | 0 | 1 | 1 | 0 | 4/2/* | 8/8/4 |
|   | 1 | -1 | -1 | 0 | 2/0/1 | 8/8/8 |
|   | 1 | -1 | 0 | 0 | */1/2 | 4/8/8 |
|   | 1 | -1 | 1 | 0 | 4/2/* | 8/8/4 |

-continued

| condition | $y_i$ | $y_{i-1}$ | $y_{i-2}$ | ĉ | $\hat{y}_j$ | $r_j$ |
|---|---|---|---|---|---|---|
|   | 1 | 0 | -1 | 0 | 4/2/* | 8/8/4 |
|   | 1 | 0 | 0 | 0 | */*/4 | 4/4/8 |
| 1 | 1 | 0 | 1 | 1 | -2/-4/* | 8/8/4 |
|   | 1 | 1 | -1 | 1 | -2/-4/* | 8/8/4 |
|   | 1 | 1 | 0 | 1 | -1/*/-2 | 8/4/8 |
|   | 1 | 1 | 1 | 1 | 0/-2/-1 | 8/8/8 | wherein //:condition 1/condition 2/other conditions; and
*: coding according to the second table;

the second table

| $y_i$ | $y_{i-1}$ | ĉ | $\hat{y}_j$ |
|---|---|---|---|
| -1 | -1 | — | — |
| -1 | 0 | 0 | -1/—/-2 |
| -1 | 1 | 0 | —/-2/-1 |
| 0 | -1 | 0 | —/-2/-1 |
| 0 | 0 | — | — |
| 0 | 1 | 0 | 2/—/1 |
| 1 | -1 | 0 | 2/—/1 |
| 1 | 0 | 0 | —/1/2 |
| 1 | 1 | — | — | where //:condition 1/condition 2/other conditions; and -: never occurs.

4. The device as claimed in claim 1, wherein operation of said modular multiplication device is periodic, with said period including a first cycle, during which addition of partial products is enabled and a second cycle, during which modular reduction is enabled.

5. The device as claimed in claim 4, wherein said select signal is set to a low logic level to enable calculation of $P_j = r_j P'_{j+1} + \hat{y}_j X$ by the adder during said first cycle, where $\hat{y}_j X$ is the partial product generated by said negate-shift register and $r_j P'_{j+1}$ is the intermediate product generated by said P register.

6. The device as claimed in claim 5, wherein the modular reduction circuit modularly reduces P[n+4:n] by d by calculating $P_j' = P_j \bmod 2^n + (u \bmod d) 2^n$.

7. The device as claimed in claim 6, further including a decoder to decode P[n+4:n] to address said RAM for selecting precomputation results for the RAM register.

8. The device as claimed in claim 4, wherein said select signal is set to a high logic level to allow transfer from the P shift register to the P register without a shifting operation, and further to enable adding of the precomputation results from said RAM register to the intermediate product from said P register by said adder.

9. The device as claimed in claim 8, wherein said addition result is fed back to the P shift register and such that the coding outputs $\hat{y}_{j-1}$ and $r_{j-1}$ produce $\hat{y}_{j-1} X$ and $r_{j-1}$ respectively.

10. The device as claimed in claim 9, wherein said coder further calculates $\hat{y}_{j-2}$ and $r_{j-2}$ to complete one period of the modular multiplication.

* * * * *